United States Patent [19]

Wong

[11] Patent Number: 5,438,112
[45] Date of Patent: Aug. 1, 1995

[54] METHOD FOR CURING SILICONE RESINS

[75] Inventor: Ching-Ping Wong, Lawrenceville, N.J.

[73] Assignee: AT&T Corp., Murray Hill, N.J.

[21] Appl. No.: 259,101

[22] Filed: Jun. 13, 1994

[51] Int. Cl.$^6$ ............................................. C08G 77/08
[52] U.S. Cl. .................................. 528/15; 264/331.11
[58] Field of Search ...................... 528/15; 264/331.11; 525/478

[56] References Cited

U.S. PATENT DOCUMENTS

| 3,900,617 | 8/1975 | Grenoble | 528/15 |
| 5,051,275 | 9/1991 | Wong | 428/76 |
| 5,213,864 | 5/1993 | Wong | 428/76 |
| 5,215,801 | 6/1993 | Wong | 427/96 |

OTHER PUBLICATIONS

A Dictionary of the Environment, Allaby, Second Edition, New York University Press (1983) p. 102.

Primary Examiner—Melvyn I. Marquis
Attorney, Agent, or Firm—Roderick B. Anderson

[57] ABSTRACT

Silicone resin is used by adding, to the uncured silicone resin, platinum suspended in a liquid carrier which is miscible in the silicone resin, the liquid carrier being selected from the group consisting of silicone oil and liquid hydrocarbon materials. The platinum preferably consists of particles of essentially pure platinum, each particle having a diameter of less than ten microns. The ratio of the platinum to the silicone resin is preferably in the range of three to ten parts per million.

17 Claims, 2 Drawing Sheets

METHOD FOR CURING SILICONE RESINS

TECHNICAL FIELD

This invention relates to methods for curing polymers and, more particularly, to methods for curing silicone resins such as those used to encapsulate electrical conductors.

BACKGROUND OF THE INVENTION

The U.S. patent of Wong, U.S. Pat. No. 5,213,864, granted May 25, 1993, is an example of the literature describing the use of heat-cured silicone resin for encapsulating microelectronic chips. Silicone resin can also be used for encapsulating electrical conductor interconnections in terminal blocks, but the volume of resin required for such use is significantly greater than that for encapsulating microelectronic chips; consequently, the time needed for heat curing such silicone is comparatively large.

The copending application of P. F. Lilienthal et al., Ser. No. 08/126,414, filed Sep. 27, 1993, describes a method for reducing the time for curing silicone resin by subjecting the resin to infrared radiation. While this method constitutes a significant improvement over curing in a conventional oven, the need for appropriate infrared apparatus complicates the production of silicone-containing products such as terminal blocks. Further, while the cure time can be reduced to 5.5 minutes by the Lilienthal et al. method, further reduction in the curing time would be desirable. Another embodiment of the Lilienthal et al. invention uses dispersed glass particles in the resin which further reduces the curing time to 3.5 minutes, but again this complicates the production process.

SUMMARY OF THE INVENTION

I have found that the time needed for curing a silicone resin can be greatly reduced by adding, to the uncured silicone resin, platinum suspended in a liquid carrier which is miscible in the silicone resin, the liquid carrier being preferably selected from the group consisting of silicone oil and liquid hydrocarbon materials. The platinum preferably consists of particles of essentially pure platinum, each particle having a diameter of less than ten microns. The ratio of the platinum to the silicone resin is preferably in the range of three to ten parts per million.

As will be explained in more detail later, platinum applied in this manner acts as a more efficient catalyst for effecting a rapid cure of the silicone resin than platinum catalysts applied in a conventional manner. In fact, platinum supplied in this manner catalyzes the curing reaction so efficiently that, for many purposes, it may not even be necessary to heat the resin. Applied heat, however, further speeds up the polymerization.

These and other features, advantages and benefits of the invention will be better understood from a consideration of the following detailed description taken in conjunction with the accompanying drawing.

DETAILED DESCRIPTION

Figure 1:
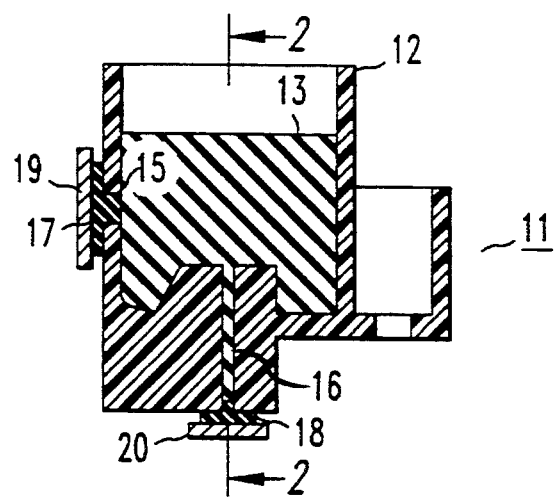
FIG. 1 is a sectional schematic view of a terminal block containing silicone which may be cured through the use of the invention.
Figure 2:
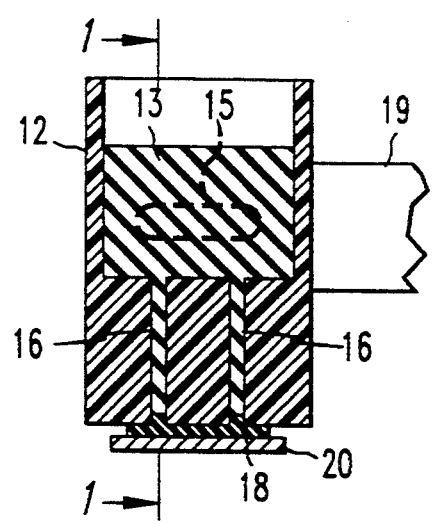
FIG. 2 is a view taken along lines 2—2 of FIG. 1.

The drawings are not necessarily to scale and have been simplified to aid in clarity of exposition. Referring to FIGS. 1 and 2, there is shown a terminal block 11 comprising a container 12 for holding a quantity of silicone resin 13. The container 13 includes windows 15 and 16, which are covered by rubber plug members 17 and 18, which in turn are secured by clamp members 19 and 20.

The silicone resin 13 is initially deposited in the container 12 in the liquid state and is then cured or polymerized to transform it from a viscous liquid to a stable gel. After the resin has been cured to form a stable resin gel, the rubber plug members 17 and 18 are removed from windows 15 and 16. As is described in more detail in the aforementioned Lilienthal et al. application, conductors (not shown) are thereafter inserted through windows 15 and 16 to make contact within the body of the silicone resin 13. The silicone resin protects and electrically insulates the conductors from the external environment, as is well understood in the art.

As mentioned in the Lilienthal et al. application, a convenient resin for use in the terminal block is DC-527, available from the Dow Corning Company of Midland, Mich. This silicone resin gel is a siloxane having vinyl terminations and hydride terminations in the ratio of 1:1. Silicone gel resin is most typically a form of polydimethylsiloxane, although it can include such related siloxane compounds as polydimethydiphenylsiloxane, polymethylphenylsiloxane and others, as are known in the art.

As will be explained in more detail later, DC-527 silicone resin, as with most similar resins, contains platinum coordinated within silicone molecules which are terminated by methyl and vinyl functional groups, the purpose of the platinum component being to speed up curing. In spite of the platinum catalyst, it is intended that DC-527 be cured by baking it, for example, to a temperature of one hundred forty degrees Centigrade. The terminal block 11 contains between two and three cubic centimeters of silicone resin, which would require a bake time of from about thirty minutes to over two hours for cure by conventional baking.

As described in the Lilienthal et al. application, this cure time can be cut to about 5.5 minutes using infrared heating. This is demonstrated by the graph of FIG. 3 in which curve 22 shows the increase in hardness of the silicone resin as a function of time during the infrared cure. The graph indicates that the resin initially has a Shore 00 durometer hardness of more than 100, indicating the liquid state, and it reaches a Shore 00 durometer hardness of sixty, i.e., a gel consistency, after about 5.5 minutes. The platinum catalyst referred to above is sufficient by itself eventually to cure the resin, as shown by the characteristic 23 of FIG. 4. That is, in the absence of any heating, conventional, infrared or otherwise, the resin will reach a hardness of sixty after about fifteen hours, due to the polymerization caused by the platinum catalyst.

The platinum catalyst normally used in silicone is coordinated within a methylvinylsiloxane molecule, as shown below:

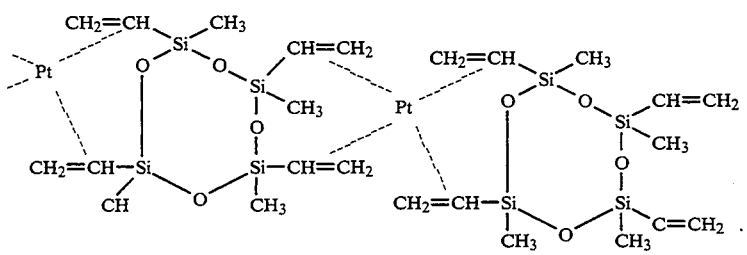

(1)

Figure 3:
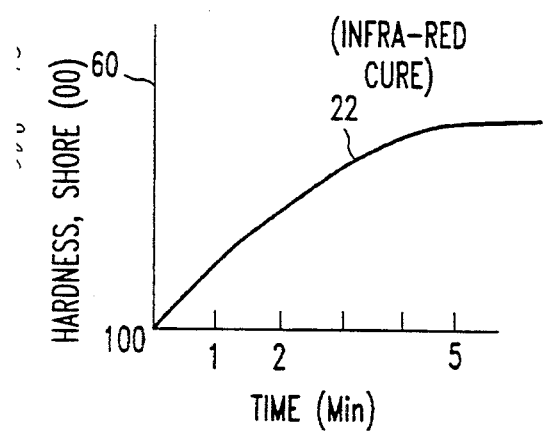
FIGS. 3 and 4 are graphs of hardness versus curing time for cures made without using the present invention.
Figure 4:
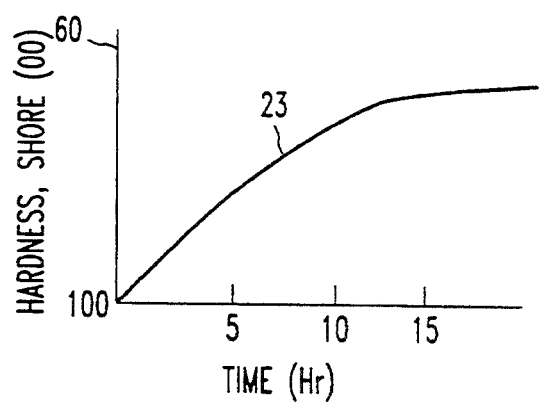

The Pt catalyst as shown above is normally included with such siloxanes as DC-527 and typically comprise from three to five parts per million of the resin. Because the platinum component is coordinated to the vinyl groups of the molecules, applied heat or applied infra-red radiation, as shown in FIG. 3, is required for achieving polymerization within a reasonable time. With applied heat, the platinum components will be released from the molecule and be sufficiently mobile to catalyze the polymer, but, as shown in FIG. 4, in the absence of heat, the time for this to occur in the container 12 would be about fifteen hours. The platinum may also be coordinated within an organic acetylene molecule; specifically, it coordinates to the triple bonded carbon atoms of such molecule. The reactivity of the platinum in such molecule is substantially the same as in the molecule of formula (1).

In accordance with the invention, suspended platinum is also added to the resin 13 of FIG. 1, the suspended platinum constituting about three to ten parts per million of the resin. The platinum is preferably in the form of pure platinum particles each having a diameter of less than ten microns, which are substantially uniformly suspended in a liquid that is miscible with the silicone resin. In a preferred embodiment, the platinum particles are suspended in silicone oil, that is, methyl terminated polydimethylsiloxane having the form

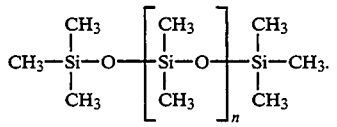

(2)

Such oil is sufficiently viscous as to suspend the particles for a reasonable time. Because the platinum particles are not chemically bonded or coordinated within the siloxane molecules, they have more mobility and are more reactive than the platinum which is coordinated within a molecule as shown in formula (1). Consequently, when they are uniformly dispersed throughout the resin 13, they cause an almost immediate cure or polymerization of the resin. With DC-527, the reaction is a hydrosilation between hydride and vinyl terminations.

Figure 5:
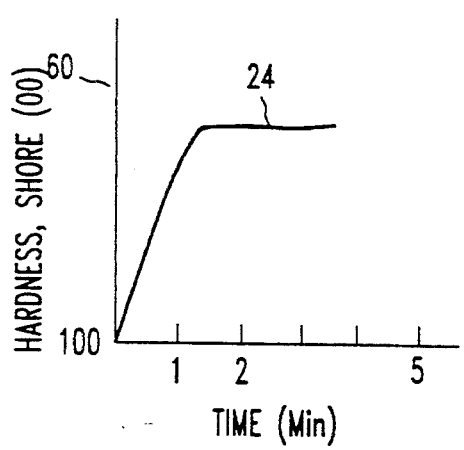
FIGS. 5 and 6 are graphs of hardness versus cure time for cures made in accordance with the invention.
Figure 6:
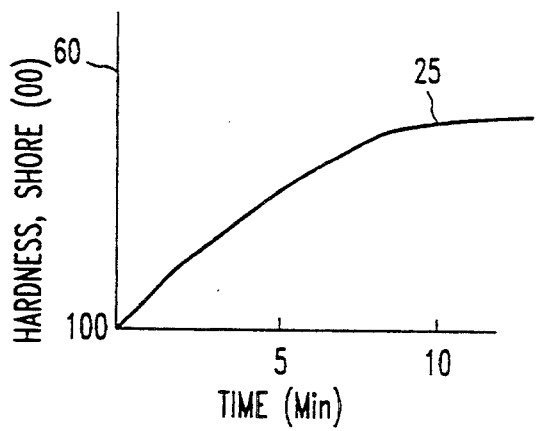

Referring to FIG. 5, with the invention, if the container 12 is placed in a conventional oven at a temperature of one hundred forty degrees Centigrade, the resin will cure in about one and a half minutes, as shown by characteristic 24. At room temperature, the total cure time with the invention is about ten minutes, as shown by curve 25 of FIG. 6. Comparing FIGS. 4 and 6 shows the dramatic improvement in the time of cure with the invention at room temperature. FIG. 5 is not directly comparable with FIG. 3 because FIG. 5 is a cure in a conventional oven without any infrared radiation. Consequently, FIG. 5 indicates a superior cure time without the added complications implicit in the use of infra-red as in FIG. 3.

By suspending substantially pure microscopic particles of platinum in a liquid that does not bond or coordinate with the platinum, and which is miscible in silicone resin, one increases the speed with which the platinum can catalyze the cure reaction. Any of various liquid hydrocarbons likewise could be used as a carrier for the platinum. The platinum particles are first suspended and uniformly distributed in the carrier by mixing. The carrier is then mixed in a conventional mixer, such as a static mixer, with the liquid uncured silicone resin, to give a substantially uniform distribution of the platinum in the resin. The mixture is immediately thereafter dispensed into the container 12 of FIG. 1; that is, it is dispensed before it is cured. This two-step process insures dispersion of the platinum catalyst uniformly throughout the resin to be cured.

The silicone resin which is catalyzed may be of any of various known forms, including polydimethylsiloxane, polydiphenylsiloxane, polymethylphenylsiloxane, polydimethyldiphenylsiloxane, polydimethyldiphenylmethylphenylsiloxane, and mixtures thereof. With the platinum catalyst applied in accordance with the invention, it is not necessary to apply the platinum in the conventional manner, e.g., platinum coordinated within methylvinylsiloxane molecules. Silicone resins, however, in practice contain this form of platinum catalyst, and thus, in normal use, the platinum in that form would also be present within the silicone resin. While the invention can be used to avoid the use of infra-red radiation, such radiation and other forms such as microwaves can be used with the invention if desired to speed up the cure. Various other modifications and embodiments may be made by those skilled in the art without departing from the spirit and scope of the invention.

I claim:

1. A method for curing a silicone resin, said method comprising the steps of:
   adding to the silicone resin particles of essentially pure platinum suspended in a liquid carrier, the liquid carrier being miscible in silicone resin and being selected from the group consisting of silicone oil and liquid hydrocarbon.
2. The method of claim 1 wherein:
   the particles each have a diameter of less than about ten microns.
3. The method of claim 1 wherein:
   the resin is selected from the group consisting of polydimethylsiloxane, polydiphenylsiloxane, polymethylphenylsiloxane, polydimethyldiphenylsiloxane and polydimethyldiphenylmethylphenylsiloxane and mixtures thereof.
4. The method of claim 3 wherein:

the ratio of said platinum to said silicone resin is in the range of about three to ten parts per million.

5. The method of claim 4 further comprising the step of:

heating said silicone resin.

6. The method of claim 5 wherein:

in addition to the suspended platinum, the silicone resin contains second platinum coordinated within silicone molecules terminated by methyl and vinyl functional groups.

7. The method of claim 6 wherein:

the ratio of said second platinum to said silicone resin is in the range of three to five parts per million.

8. The method of claim 7 wherein:

the particles each have a diameter of less than ten microns.

9. The method of claim 8 wherein:

the liquid carrier consists of silicone oil.

10. A method for making devices comprising the steps of:

first, mixing particles of platinum in a liquid, the liquid being miscible in silicone resin;

second, mixing the liquid with uncured silicone resin;

and third, dispensing the uncured silicone resin into a container.

11. The method of claim 10 wherein:

the size of the platinum particles is sufficiently small with respect to the viscosity of the liquid that said first mixing step results in a substantially uniform distribution of the platinum throughout the liquid at least until such time as the second mixing step occurs.

12. The method of claim 11 wherein:

the second mixing step results in a substantially uniform distribution of the platinum throughout the silicone resin.

13. The method of claim 12 wherein:

the platinum particles each have a diameter of less than about ten microns.

14. The method of claim 13 wherein:

the resin is selected from the group consisting of polydimethylsiloxane, polydiphenylsiloxane, polymethylphenylsiloxane, polydimethyldiphenylsiloxane and polydimethyldiphenylmethylphenylsiloxane and mixtures thereof.

15. The method of claim 14 wherein:

the ratio of said platinum to said silicone resin is in the range of about three to ten parts per million.

16. The method of claim 15 further comprising the step of:

heating said uncured silicone resin to hasten its cure.

17. The method of claim 16 wherein:

the liquid is a silicone oil.

* * * * *